United States Patent Office 2,965,663
Patented Dec. 20, 1960

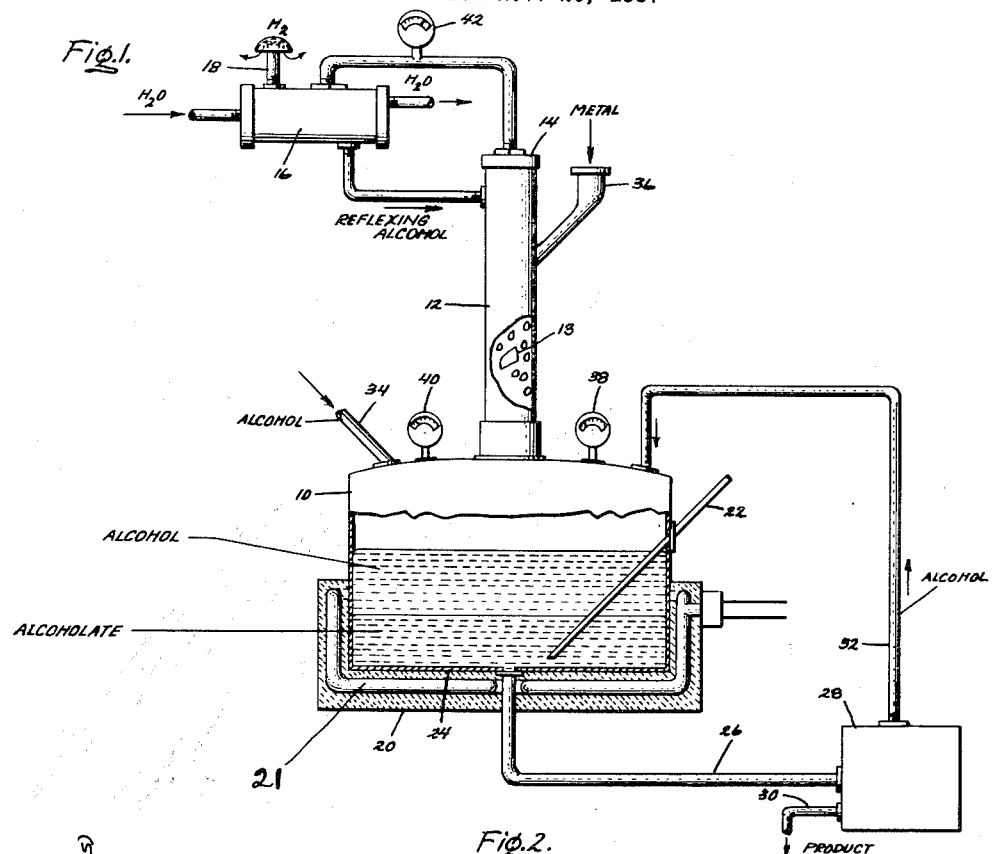
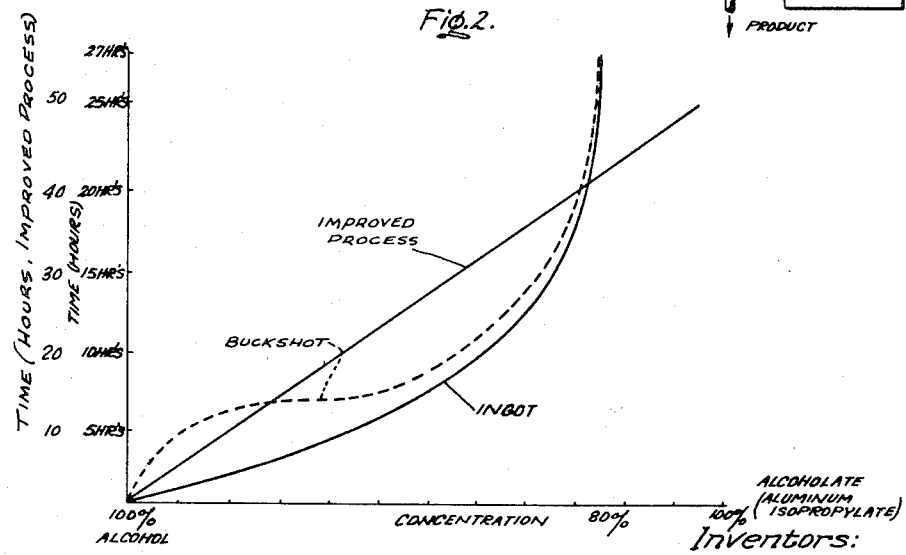

2,965,663

PROCESSES FOR PREPARING METAL ALKYLS AND ALKOXIDES

William E. Smith and Amos R. Anderson, Adrian, Mich., assignors to Anderson Chemical Company, Weston, Mich.

Filed Nov. 25, 1957, Ser. No. 698,821

4 Claims. (Cl. 260—448)

This invention encompasses processes for preparing organo-metallic compounds. The term "organo-metallic compounds" is meant to include metal alkoxides in addition to carbon-metal bonded compounds.

The processes include only those materials in which the vaporization temperature of the volatile reactant is below the melting point of the metal reactant.

Those reactions which are concerned may be either reversible or irreversible, and, as will be explained herein, we propose these processes for making a wide assortment of organo-metallics characterized as metal alkoxides, metal alkyls, Grignard reagents, etc.

There are numerous technical problems associated with the preparation of such organo-metallic materials as metal alkyls and metal alkoxides. For example, in the process of manufacturing aluminum isopropoxide, the aluminum metal and isopropyl alcohol are heated together in a reaction vat under closely guarded temperature conditions until the reaction commences, whereupon the heat of reaction (this being an exothermic reaction) produces untoward temperature rise in the reaction mass to accelerate the rate of reaction. In order to control reaction conditions for safety in operation, elaborate heat exchange means must be devised for controlling both the heating of the reaction mass and dissipating the heat of reaction. These control means are costly and usually require attendance in operation. At best, such measures (if functioning satisfactorily) add to the cost of manufacture and necessitate the usage of pressure equipment. In the event of malfunctioning of the control means, then the reaction can be quite hazardous.

It is one of the objects of the present invention to eliminate the hazard of the batch type process by removing through volatilization increments of the organic reactant and conducting the vapors to a remotely located metal reactant to be there reacted with the metal, the reaction product material being then removed from the metal reactant to make available the metal surface for further reaction. The process itself provides the proper stoichiometric proportions of materials which in turn leads to avoidance of waste and complications of purification. These principles have led to substantial improvements, among which are: safety considerations; 100% completion of reaction (based on the volatile reactant which is always in the lower stoichiometric amount) is always realized since the volatile reactant (reactants) is completely used up; purification of the final product is greatly simplified; for example, none of the metal need be removed as an impurity since it is permanently located remotely from the final product; since an excess of metal is used all of the volatile reactant is converted and is not necessary to remove for final purification; the time for producing a quantity of reaction product compound proceeds at a constant rate.

The reaction proceeds by increments and because only a small amount of reactants are involved at any instant, this makes possible reaction conditions which may be easily controlled and the hazards normally associated with these reactions are wholly obviated; the equipment used in performing the process is economical to construct and its operation does not require continual attendance as does the equipment in a batch type process where conditions are non-self-regulating; the process lends itself to continual operation so that the reaction product becomes much more producible; catalysts may be discarded in the present invention as a means of starting the reaction. Of further advantage is that one of the reactants, the metal, is continuously washed free of reaction product to be available for further reaction with the volatile reactant.

Foremost among these advantages which we claim for the invention are the safety and greater producibility provided in the manufacture of alkoxide and alkyl compounds.

Other objects and features of the invention, in addition to those cited, will become apparent from the following description, which proceeds with reference to the accompanying drawings, in which:

Fig. 1 is a schematic drawing of an apparatus adapted for continuous production of aluminum isopropoxide in accordance with our improved process; and, Fig. 2 is a chart showing in terms of Time v. Temperature the reaction history of a batch type process for making aluminum isopropoxide using aluminum in "buck shot" and ingot forms, respectively. The reaction history of the process embodying the present invention is represented by the straight line having a constant slope.

In previously followed processes for producing organo-metallic compounds, such as metal alkoxides, the metal and alcohol were heated together until the reaction was initiated and thereupon the temperature of the reaction mass would undergo a temperature surge.

For purposes of illustration, assume that the product to be synthesized is aluminum isopropoxide which is produced by the following reaction:

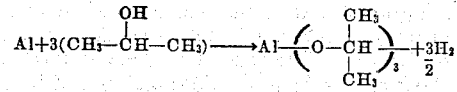

Aluminum isopropoxide is a commercially important product, commonly used in organic sythesis, as a catalyst, a cross-linking agent, and has a wide range of other applications.

In following the batch type process, a reaction vat (not shown) is charged with a mixture of isopropanol and aluminum metal. A catalyst such as mercuric chloride may also be included to start the process. The reaction proceeds, accompanied by the liberation of considerable heat, this being an exothermic reaction. The major portion of this liberated heat goes into heating the reactants with the effect of further accelerating the reaction. If uncontrolled, this produces ultimately a temperature surge which is accompanied by liberation of energy and hydrogen in such amounts as to produce an explosion owing to overheating of the volatile reactants and the uncontrolled spontaneity of reaction. The rapid build up of pressure from the liberated gas and reactants may cause failure of the equipment. The temperature surge is difficult if not impossible to avoid. To circumvent the dangerous temperature surge, the reaction must proceed through the discontinuous intervals accompanied by abstraction of heat from the reactants in order to control the reaction rate and prevent explosion.

Referring next to Fig. 1, there is shown a vessel or reaction kettle 10 which is initially charged with a quantity of the vaporizable organic reactant, e.g., isopropyl alcohol. Above the vessel is a column 12 containing the metal reactant 13 which forms a packing within the column 12 (e.g., aluminum) and which is isolated at all times from the interior of the vessel 10. At the top 14 of the column 12 is a combination condenser 16 and vent 18 which allows any gas (such as hydrogen) formed during the reaction to be released from the apparatus. A heating jacket 20 surrounds the vessel 10 and by means of steam or hot water circulated through passages or conduits in the heating jacket the contents of the vessel are controllably heated to the desired temperature. Instead of conduits, electrical heating elements 21 may be used for this purpose. Extending through the wall of vessel 10 is an inclined siphon tube 22 having its lower end submerged in the contents. This siphon may be provided with a shut-off valve (not shown) as needed.

At the base 24 of the vessel is an outlet line 26 which leads to a flash tube still 28 where the reacted volatile constituent reactant is removed and then returned to the reaction vessel via return line 32. The pure product (aluminum isopropoxide) is then continually withdrawn at the bottom of the still. The product can be further purified by vacuum distillation if desired.

The process can proceed continuously and the reactants replenished in the vessel 10 and column 12, respectively, by means of a charging line 34 and inlet chute 36.

Appropriate indicator gauges 38, 40 are used to give the temperature-pressure conditions within the reaction vessel 10 and a temperature gauge 42 is located at the top of the column 12 to give a temperature reading of the material refluxed through the column 12.

*Example 1*

Assuming that the product desired is aluminum isopropoxide, 2,478 lbs. of anhydrous isopropyl alcohol are charged to the vessel 10 through inlet line 34 and the column 12 is filled with 540 lbs. of aluminum ingots (6 lb. ingots) through the chute 36. The amount of aluminum is increased from time to time to be in excess of that required to completely react the alcohol in the vessel below. About 9 grams of mercuric chloride and 2 grams of iodine may be included with the aluminum to start the reaction, though this is not necessary. The aluminum is provided in a size range sufficient to give the desired reaction rate but is not so small as to cause clogging of the still. The rate of reaction is then controlled by both area of ingot provided and rate of heating the vat. Steam is then introduced to heating jacket 20 and the isopropyl alcohol commences refluxing through the column at a moderate rate (this not being a critical factor the only important consideration is that the column not be flooded).

As the isopropyl alcohol vapors rise upwardly through the column 12 a fraction of the alcohol reacts therewith with the aluminum packing 13 within the column 12 to form aluminum isopropoxide in accordance with the reaction previously set forth.

Uncondensed isopropanol (and hydrogen gas which is formed as a reaction by-product) continues to rise through the column 12 and is conducted to the condenser 16 where the isopropanol is condensed and returned through the reaction column 12. The hydrogen is vented to atmosphere through the line 18.

After about 30 hours of refluxing the column is charged with about 160 pounds of additional aluminum ingots.

It will be noted that there are various distinct phases within the column 12; the rising vaporous phase of isopropanol, a liquid phase consisting of isopropanol refluxing through the column, and a solid phase consisting of aluminum isopropoxide dissolved in the isopropanol. This intermixture of phases provides several distinct advantages—the descending current of liquid isopropoxide washes the aluminum surface free of aluminum isopropylate, thereby providing a fresh surface of aluminum for further reaction. By continuously removing the reaction product from the aluminum reactant, the reaction is forced to go to 100% completion. The reaction taking place within the column involves only a fraction of the isopropanol within the vessel 10 and thus the problem of temperature control is much simplified because the amount of heat liberated is lower and can be abstracted much more efficiently and at a faster rate than would be the case of controlling the temperature of the entire mass within the vessel 10 which by its very bulk impairs any speed of temperautre control. Our process includes the novel concept of vaporizing and then reacting the mass of isopropanol by incremental amounts in which each increment of isopropanol is first vaporized and then passed upwardly into the column which is the reaction zone.

The reaction product is returned by the refluxing isopropanol to the vessel containing the unreacted liquid phase isopropanol.

The conditions of reaction within the column can be considered as an adibatic system of reaction and for this reason we believe that the undesirable batch reaction conditions are avoided. The underlying reason for this is in the mechanism of the refluxed unreacted liquid alcohol which is returned to the column and is thereafter reacted with the aluminum, or revaporized, or returned to the reaction kettle with dissolved reaction product therein.

The intermixture of liquid solid and gaseous phases within the column creates a heat balanced reaction environment which remains so throughout the process. The net result is that the heat of reaction is controlled by using one of the reactants as a heat transfer medium and in abstracting heat it becomes removed from the reaction environment to reduce the degree of reaction.

The descending liquid phase isopropanol refluxes at such a rate that not all of it is reacted with the aluminum as it passes downwardly. Some of the liquid isopropanol is revaporized and some re-enters the vessel 10 in liquid form, bringing with it the reaction product aluminum isopropoxide which is thereby continuously washed from the column 12 as it is formed.

The contents of the vessel 10 thus changes in composition, and the concentration of aluminum isopropoxide gradually builds up until all of the isopropanol is exhausted, which is indicated by the temperature within the vessel 10 (gauge 40) or by the decreasing head temperature (which is the temperature of vapor leaving the column). The total time period for converting the 2,478 pounds of isopropanol to aluminum isopropoxide is about 60 hours. The reaction product includes only about 48 pounds of residue and 16 pounds of unreacted alcohol. As the concentration of the reaction product within the vessel 10 increases, the temperature continues to rise until the temperature reading indicates that the isopropanol is completely exhausted and the vessel contents comprise essentially 100% pure aluminum isopropoxide. Another indication that the reaction is complete is that the reflux stops and the head temperature increases.

Throughout the reaction no operator is required to periodically quench the reaction or regulate the rates of flow. As a result, the rate of reaction is steady and follows the path indicated by the straight line in the Concentration v. Time chart shown in Fig. 2.

At the end of the process which we propose, substantially 100% pure aluminum isopropoxide is present in the reaction vessel 10, there is no problem of separation from the reactants—the aluminum is isolated and remains isolated from the interior of the vessel 10 throughout the reaction. Any isopropanol which is dissolved in the metal alkoxide can be removed by distillation but the final temperature within the vessel 10 toward the end of the reaction is sufficiently high to insure substantially complete removal of isopropanol.

In contrast with this, the product produced by the batch type process is usually between 70% and 80% pure product and the product must be purified by filtering out unreacted aluminum and stripping out the unreacted isopropanol.

The process described can be made continuous by constant withdrawal of aluminum isopropoxide from the vessel 10 through line 26, and stripping the product in still 28 of isopropyl alcohol which is returned to the vessel via line 32. The pure product is continuously removed from the still through line 30.

The supply of isopropanol within the vessel 10 is either continuously or intermittently replenished through line 34 and the supply of aluminum in column 12 is replenished through chute 36.

The aluminum isopropoxide, as it is formed and is returned to the vessel, can be further reacted with salicylic acid which is included with the initial charge of isopropyl alcohol; this being an in situ reaction. The final product in this instance is aluminum salicylate. This example in situ reaction will suggest other reactions in which an intermediate product is first formed and thereafter further reacted to yield the final desired product.

*Example 2*

The foregoing process of producing organo-metallics of the alkoxide class has been followed substantially as described for making: aluminum ethylate, magnesium methylate and sodium methylate, and lithium methylate according to the following reactions:

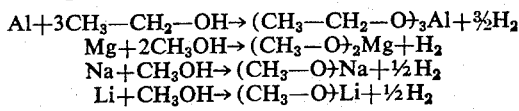

From these examples, other reactions will suggest themselves to those skilled in the art. It is intended to include materials and reactions which are the functional equivalents of those indicated.

The reactants in each case were the indicated alcohols and metals. In each instance, the metal was isolated from the vessel contents and located in the column 12, the liquid alcohol charged to the vessel 10 and the refluxing of alcohol through the column produced eventual conversion of the alcohol content in the vessel 10 to the corresponding metal alkoxide. The reaction product is washed into the vessel 10 by liquid phase unreacted alcohol which is refluxed and removes the metal alkoxide from the column 12 and transfers it into the vessel 10.

The results are summarized as follows:

| | Alcohol Charge (grains) | Metal in column | Heat Time, hrs. | Metal Residue |
|---|---|---|---|---|
| Lithium methylate | 200 g. methanol. | 3½ g. Li | 1¼ | .4 g. |
| Aluminum ethylate | 250 g. ethanol. | 56 g. Al | 10¾ | |
| Magnesium methylate | 1,784 g. methanol. | 24 g. Mg | 10 | ² .9 g. |
| Sodium methylate ¹ | 160 g. methanol. | 8 g. Na | 9 | 2 g. sodium. |

¹ Heat reaction so great; tendency for metal to drop down from tower.
² Also traces Mg(OH)₂.

*Example 3*

The described process is also useful for producing metal alkyls. The only difficulty encountered here is removing the salt product from the reaction zone (that part of the column where the metal packing is located) and this can be done by proper attention to return flow rate—by employing ordinary engineering skill. It is recommended that a diluent be included with the alkyl halide to form an azetrope with the salt to flush the salt from the tower and yet be inert to the metal alkyl.

The general reaction for making the metal alkyl is represented by the following:

$CH_3-CH_2-CH_2-CH_2-Br+2Li$
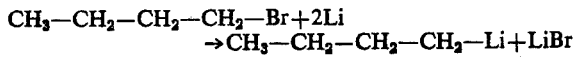

In the process of preparing butyl lithium, 237 grams of butyl bromide is charged to a round bottom flask and the reaction column connected therewith is filled with 7 grams of lithium.

The vessel 10 is then heated for twelve (12) hours to elevate the temperature of the vessel contents sufficiently to produce a gentle refluxing of the alkyl halide through the reaction column. A fraction of vaporous alkyl halide which condenses in the column reacts with the lithium to form metal alkyl in accordance with the foregoing reaction. Refluxed unreacted liquid phase alkyl halide washes the reaction product downwardly and returns it to the flask. The reaction column is thus constantly washed free of reaction product and so the metal reactant is more receptive to further reaction. The alkyl halide which condenses in the column originates from incoming vaporous phase and also the refluxing liquid phase alkyl halide. With the described procedure, yields of butyl lithium of about 27.4% are obtainable.

The high yield of product is made possible by virtue of isolating the reactants and joining them only by transition of one of the reactants (the butyl bromide) from a liquid phase to vapor phase and then conducting said vapor phase to the reaction situs.

The process has all of the inherent advantages of heat control because the reaction proceeds incrementally, viz., the bulk of the alkyl halide is not exposed to the lithium but only such fraction as is volatilized and elevated into the reaction zone. Thus, only a fraction of the whole charge of alkyl halide is at any one instant undergoing reaction and the orders of heat liberation are much smaller and are therefore easier to control both by time and amount. The heat of reaction is transferred through the medium of the vaporous alkyl halide to the condenser 16, the condensed alkyl halide then being returned to the column 12.

The described processes are useful in synthesizing organometallics in general from starting metals and alcohols, glycols, etc.; metals and alkyl halides.

The synthesis of Grignard reagent is obviously suggested from the disclosed examples as are a variety of other transition metal reactions.

It is intended that such variations, revisions, and applications of the invention as are reasonably to be expected from those skilled in the art will be included within the scope of the following claims.

What is claimed is:

1. A process for producing metal alkoxides from solid phase metals selected from the group consisting of aluminum, magnesium, sodium and lithium, comprising the steps of; forming a packing of said metal within a column, heating a quantity of alcohol which is in the liquid phase at room temperature and having a boiling point below the melting point of said metal and located within a container disposed at the base of said column and separated completely from said solid phase metal, supplying vapor phase alcohol produced in fractional amounts by said heating to said packing and effecting at least partial alkoxidation of said amounts within said packing, condensing the remainder of vaporized and unreacted alcohol and returning it countercurrently through said packing to provide self-regulation of the rate of production of the alkoxide within the packing and to abstract heat from within the column at a rate maintaining the packing in its solid phase condition, removing the metal alkoxide produced within the column by the countercurrent flow of unreacted alcohol for its return to said container, venting the liberated hydrogen from said column to relieve superatmospheric pressure within said column, and continuing to heat said alcohol to effect successively its fractional vaporization and successive reaction whereby said alcohol is substantially converted by degrees to metal alkoxide whereby the composition in said container is converted by degrees from substantially pure alcohol to substantially pure alkoxide.

2. A process for producing metal alkoxides from solid phase metals selected from the group consisting of aluminum, magnesium, sodium and lithium, comprising the steps of; providing a packing of said metal within a column and of a size permitting gaseous and liquid phase flow countercurrently therein, disposing separately from said packing a quantity of liquid phase alcohol which is isolated from said metal and within a container connected with said column, said alcohol having a boiling point below the melting point of said metal packing, controlling the rate of reaction by selectively partially vaporizing the alcohol and passing the vaporized fractions to within said packing, effecting at least partial alkoxidation of said vapor within said metal packing, condensing and refluxing unreacted vaporized alcohol to abstract heat from the alkoxidation reaction and to regulate the rate of reaction, the rate of refluxing being sufficient to maintain the column temperature below the melting point of said solid phase metal reactant, removing the alkoxide material by the refluxing unreacted alcohol within said column to the container having the charge of alcohol therein, continuing to heat said alcohol which is converted by degrees first to vapor phase and thereafter reacted with said metal to produce a reaction product which is returned countercurrently with the refluxing alcohol to the alcohol container, and venting liberated hydrogen from said column to relieve superatmospheric pressure within said packing and container.

3. A process for producing metal alkyls comprising the steps of; forming a packing of solid phase metal particles of sufficient size, providing countercurrent gaseous and liquid phase flow therein, said solid phase metal being selected from the group consisting of aluminum, magnesium, sodium and lithium, providing within a container a charge of alkyl halide material which is in the liquid phase at room temperature and which is located in separated relation from said packing, providing an inert atmosphere surrounding said packing, heating to partially vaporize said alkyl halide material and conducting the vapor fraction to said metal packing to effect at least partial alkylation of said halide material with the metal packing, condensing and refluxing unreacted vapor phase halide material through said packing as a liquid phase to remove the metal-alkylation reaction products within said packing and carry it to the situs of original liquid phase alkyl halide charge, and continuing to heat said alkyl halide until the entirety thereof is first vaporized by fractions totalling the entire original liquid charge and thereafter reacted with said packing and the reaction product removed.

4. A process for producing metal alkoxides and metal alkyl compounds by a self-embodied compensated reaction, comprising the steps of; forming a packing of solid phase metals selected from the group consisting of metals of groups IA, IIA and IIIA and having a particle size providing for countercurrent gaseous and liquid flow therein, locating separately from said packing a vaporizable charge of liquid phase material selected from the group consisting of alcohols and alkyl halides having a boiling point below the melting point of the solid phase packing, providing an inert protective atmosphere surrounding said packing, heating the charge of liquid phase material to supply by fractional vaporization a continuous vapor phase flow through the solid phase metal packing and effecting at least partial reaction of said fractionally vaporized flow therewith, condensing and refluxing a portion of said vapor phase flow to abstract the heat of reaction and regulate the amount of vaporizable reactant exposed to said packing, and removing the reaction product from within said packing in accompaniment with the reflux countercurrent flow passing through the solid phase metal packing.

References Cited in the file of this patent
UNITED STATES PATENTS

| | | |
|---|---|---|
| 2,579,251 | Coates et al. | Dec. 18, 1951 |
| 2,845,447 | Carlson et al. | July 29, 1958 |